United States Patent [19]

Throckmorton

[11] 4,148,983

[45] Apr. 10, 1979

[54] POLYMERIZATION AND COPOLYMERIZATION OF TRANS-PIPERYLENE AND ISOPRENE

[75] Inventor: Morford C. Throckmorton, Akron, Ohio

[73] Assignee: The Goodyear Tire & Rubber Company, Akron, Ohio

[21] Appl. No.: 893,725

[22] Filed: Apr. 5, 1978

[51] Int. Cl.$^2$ ............................ C08F 4/50; C08F 4/52
[52] U.S. Cl. ................................ 526/139; 252/431 P; 260/33.6 A; 526/77; 526/308; 526/335; 526/337
[58] Field of Search ....................................... 526/139

[56] References Cited

U.S. PATENT DOCUMENTS

| | | | |
|---|---|---|---|
| 2,825,721 | 3/1958 | Hogan et al. | 526/106 |
| 3,114,743 | 12/1963 | Horne | 526/159 |
| 3,429,940 | 2/1969 | Wadsworth | 526/144 |
| 3,754,048 | 8/1973 | Wu et al. | 260/680 B |
| 3,804,913 | 4/1974 | Goodwin | 260/666 R |

FOREIGN PATENT DOCUMENTS 543292 6/1956 Belgium.
835752 5/1960 United Kingdom.

OTHER PUBLICATIONS

C.A. 82, 112312c (1975).
Proc. Acad. Sci. USSR 169, 790 (1966).
Bull. Acad. Sci. USSR Div. Chem. Sci., 2059 (1967).
Dokl. Acad. Nauk. SSSR 124, 595 (1959).
Polym. Sci. USSR 9, 1802 (1968).
CA 80, 109590v (1974).
CA 80, 4644m (1974).
J. Polym. Sci., Chem. Ed. 11, Vasiliev et al., pp. 2489-2499 (1973).

*Primary Examiner*—Stanford M. Levin
*Attorney, Agent, or Firm*—J. Y. Clowney

[57] ABSTRACT

There is disclosed a method for the polymerization and copolymerization of diolefins selected from the group of monomers consisting of trans-1,3-pentadiene and isoprene employing as a catalyst a mixture of (A) an organometallic compound selected from the group consisting of aluminum trialkyls, magnesium dialkyls and zinc dialkyls, (B) a soluble chromium compound selected from the group consisting of chromium salts of organic acids containing from 2 to 20 carbon atoms, organic complex compounds of chromium containing tridentate ligands and $\pi$-bonded organochromium compounds, and (C) a member selected from dialkyl hydrogen phosphites, diaryl hydrogen phosphites and tris(2-chloroethyl)phosphite.

11 Claims, No Drawings

POLYMERIZATION AND COPOLYMERIZATION OF TRANS-PIPERYLENE AND ISOPRENE

BACKGROUND OF INVENTION

This invention is directed to a method of polymerization and/or copolymerization of diolefins selected from the group of monomers consisting of trans-1,3-pentadiene and isoprene. It is also directed to catalyst systems used in these polymerizations. The products of these polymerizations have properties ranging from rubbers to plastics and thereby find utility in the preparation of vulcanized rubber products and plastics. The polymers which have glass transition temperatures (Tg's) which are relatively low may be utilized in tire carcass stocks while those with high Tg's may be used in tread stocks.

More specifically, this invention is directed to the use of a tertiary catalyst system comprising (A) an organometallic compound selected from the group consisting of trialkylaluminums, dialkylaluminum hydrides, dialkylmagnesiums, and dialkylzincs, (B) a soluble chromium compound selected from the group consisting of chromium salts of organic acids containing from 2 to 20 carbon atoms, organic complex compounds of chromium containing tridentate organic ligands, and $\pi$-bonded organochromium compounds, and (C) a member selected from tris(2-chloroethyl)phosphite, dialkyl hydrogen phosphites and diaryl hydrogen phosphites, to polymerize and copolymerize diolefins selected from the group of trans-1,3-pentadiene and isoprene.

Belgian Patent Nos. 530,617 and 535,082 and U.S. Pat. No. 2,825,721 were among the first to describe a partially reduced or partially oxidized chromium oxide supported on silica alumina cracking catalyst for the polymerization of ethylene.

U.S. Pat. No. 3,114,743 reported that butadiene was polymerized to a trans-1,4-polybutadiene using either $CrCl_3$ and diethylaluminum hydride or chromium acetylacetonate and triethylaluminum; the same catalyst polymerized isoprene but the polymer was not described. However, Belgian Patent No. 543,292 indicates that when diisobutylaluminum hydride-$CrCl_3$ were used to polymerize isoprene, a 1,4-polyisoprene was obtained.

Italian Patent No. 538,453 and British Patent No. 835,752 indicate that a binary catalyst system of chromium acetylacetonate and triethylaluminum polymerizes butadiene to a prevailingly 1,2-enchained linear polybutadiene and isoprene to prevailingly 3,4-polyisoprene.

Polyisoprenes prepared with a binary catalyst system such as chromium acetylacetonate plus triethylaluminum or tris($\pi$-allyl)chromium plus a Lewis acid were generally low molecular weight liquids which had intrinsic viscosities of about 0.2 dl/g. This is reported in J. Polym. Sci., Chem. Ed 11, 2489 (1973).

In Proc. Acad. Sci. USSR 169, 790 (1966) it is reported that the presence of oxygen with tris(crotyl)chromium during the polymerization of butadiene caused almost complete inversion of the polymer microstructure from normally about 83 percent 1,2- to about 95 percent trans-1,4-polybutadiene. It has been reported in Bull. Acad. Sci. USSR, Div. Chem. Sci., 2059 (1967) that trichloroacetic acid with tris(crotyl)chromium polymerized butadiene to 93 percent cis-1,4-polybutadiene.

Polymers having high 1,4-trans-enchainments of isoprene and butadiene have been prepared using a chromia supported on silica-alumina, as reported in Dokl. Akad. Nauk. USSR 124, 595 (1959) and Polym. Sci. USSR 9, 1802 (1968).

Chem. Abs. 80, 109590 v (1974) reports the preparation of 1,2-polybutadiene by polymerizing butadiene in the presence of hydrogen using chromium acetylacetonate, dibutylphosphonate and triisobutylaluminum.

Chem. Abs. 80, 4644 n. (1974) reports that a polymer analyzing 95 percent 1,2-polybutadiene was prepared using a chromium compound, an organoaluminum compound and phosphoric acid ester catalyst system.

It has been reported in Kobunshi Ronbunshu 31, 754 (1974) that a binary catalyst system comprised of chromocene (dibenzene chromium) and an organic halide polymerized butadiene to a polymer having a microstructure very similar to that produced by radical initiators, that is, about 67% trans-1,4; 15% cis-1,4- and 18% 1,2-polybutadiene.

In U.S. Pat. Nos. 3,429,940 and 3,804,913 there is reported that a ternary catalyst system comprising chromium acetylacetonate, triethylaluminum and an aliphatic halide, such as t-butyl chloride, oligomerized conjugated diolefins such as butadiene, isoprene and piperylene, to large ring cyclic trimers such as trimethyl cyclododecatriene.

There is reported in U.S. Pat. No. 3,754,048 that another ternary catalyst system using chromium acetylacetonate, triethylaluminum and a nitrogen containing compound, such as $\alpha$-(2-pyridyl)benzylidine-p-toluidine produced oligomers of butadiene, isoprene or piperylene. It is reported therein that the polybutadienes having molecular weights between about 300 and about 1400 were prepared and recovered in about 90 percent yield; less than 10 percent of the polybutadiene had a molecular weight between 1400 and 5500.

Therefore, to summarize, there has been no catalyst system containing chromium which has been previously used to prepare solid elastomers of trans-1,3-pentadiene and isoprene.

SUMMARY OF THE INVENTION

The invention consists of the polymerization and copolymerization of at least one diolefin selected from the group consisting of trans-1,3-pentadiene and isoprene employing as a catalyst a mixture of (A) at least one organometallic compound selected from the group consisting of aluminum trialkyls, magnesium dialkyls and zinc dialkyls, (B) at least one soluble chromium compound selected from the group consisting of chromium salts of organic acids containing from 2 to 20 carbon atoms, organic complex compounds of chromium containing tridentate ligands and $\pi$-bonded organo chromium compounds and (C) at least one member selected from tris(2-chloroethyl)phosphite, dialkyl hydrogen phosphites and diaryl hydrogen phosphites.

DETAILED DESCRIPTION OF INVENTION

The soluble chromium compounds employed in the practice of this invention may be chromium salts of carboxylic acids containing from 2 to 20 carbon atoms. The organic complex compounds of chromium containing tridentate organic ligands are also suitable. Tridentate organic ligands have three positions to which a covalent or coordinate bond with the metal may be formed. Representative of such a chromium containing tridentate compound is chromium acetylacetonate. The $\pi$-bonded organochromium compounds may be represented by tris(allyl)chromium, tris(methylallyl)- chromium, tris(crotyl)chromium, π-cyclopentadiene chromium tricarbonyl and π-phenyl chromium tricarbonyl.

The preferred soluble chromium compounds useful in this invention are the chromium salts of organic acids and may be represented by chromium octanoate, chromium benzoate, chromium neo-decanoate, chromium benzoate, chromium neo-decanoate, chromium naphthenate, chromium oxalate and chromium stearate. Of all the soluble chromium compounds, the most preferred are chromium naphthenate, chromium neo-decanoate, and chromium octanoate.

The organometallic compounds employed in this invention are aluminum trialkyls or dialkylaluminum hydrides, representative examples of which are aluminum trimethyl, aluminum triethyl, aluminum tri-n-propyl, aluminum tri-n-butyl, aluminum triisobutyl, aluminum tripentyl, aluminum trihexyl, aluminum trioctyl, diethyl-aluminum hydride and diisobutylaluminum hydride and the like.

The dialkyl magnesium compounds useful in this invention may be represented by di-n-hexylmagnesium and n-butylethylmagnesium and the like.

The dialkyl zinc compounds may be represented by diethylzinc and dibutylzinc and the like.

The dialkyl hydrogen phosphites may be represented by the tautomeric structures:

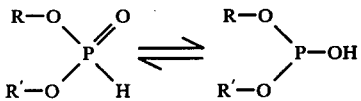

where R and R' indicate alkyl groups which may or may not be identical. The dialkyl phosphites exist substantially in the keto form (shown on the left) and are associated in dimeric or trimeric groupings by hydrogen bonding. The nomenclature dialkyl hydrogen phosphite, if applied strictly, describes only the keto tautomer, but it commonly is applied to both tautomeric forms and that it is the intent herein. The phosphites of this invention may be described further as having at least one phosphinic hydrogen atom.

The dialkyl hydrogen phosphites useful in the preparation of the catalyst of this invention are those containing from 1 to 20 carbon atoms in the alkyl groups. They may be represented by dimethyl hydrogen phosphite, diethyl hydrogen phosphite, diisopropyl hydrogen phosphite, dibutyl hydrogen phosphite, bis(2-ethylhexyl)hydrogen phosphite or dioctyl hydrogen phosphite, didodecyl hydrogen phosphite, dioctadecyl hydrogen phosphite, ethyl butyl hydrogen phosphite, methyl hexyl hydrogen phosphite and the like.

Diaryl hydrogen phosphites containing from 6 to 12 carbon atoms in the aryl groups may also be employed in the practice of this invention. They may be represented by dibenzyl hydrogen phosphite and diphenyl hydrogen phosphite. Cycloalkyl hydrogen phosphites, such as dicyclohexyl hydrogen phosphite, also may be used; and a monoalkyl-, monoaryl hydrogen phosphite, such as ethyl phenyl hydrogen phosphite and butyl benzyl hydrogen phosphite may also be utilized.

Tris(2-chloroethyl)phosphite is also useful in the invention.

The dialkyl hydrogen phosphites containing from 1 to 8 carbon atoms per alkyl group are the preferred phosphite containing compounds.

The catalyst system of the present invention has polymerization activity over a wide range of total catalyst concentration and catalyst component ratios. Catalyst components apparently interreact to form the active catalyst species. As a result, the optimum concentration for any one catalyst component is dependent upon the concentrations of the other catalyst components. While polymerizations will occur over a wide range of catalyst concentrations and ratios, the polymers having the most desirable properties are obtained within a narrower mole ratios range.

The molar ratio of the organometallic compound to the chromium compound (Me/Cr) can be varied from about 20/1 to about 2/1. However, a more preferred range of Me/Cr is from about 8/1 to about 4/1.

The molar ratio of the tris(2-chloroethyl)phosphite, dialkyl or diaryl hydrogen phosphite to chromium compound (P/Cr) may be varied from about 0.2/1 to about 10/1, with a more preferred range of P/Cr being from about 0.5/1 to about 3/1.

Catalyst components may be charged to the polymerization system as separate catalyst components in either a step-wise or simultaneous manner, usually called the in situ preparation. The catalyst components may also be preformed by premixing the three components outside of the polymerization system. The resulting premixed catalyst components then may be added to the polymerization systems.

The amount of total catalyst employed depends on such factors as purity of the components, polymerization rate desired, and the temperature. Therefore, specific total concentrations of catalyst cannot be set forth except to say that catalytic amounts should be employed. Successful polymerizations have been made using molar ratios of monomer to the chromium component in the ternary catalyst system ranging between about 300/1 to about 4,000/1. The preferred monomer to chromium concentration generally is between 600/1 and 2,000/1. Certain specific total catalyst concentration and catalyst component ratios which produce polymers having desired properties are illustrated in the examples elsewhere in the specification.

In general, the polymerizations of this invention are carried out in inert solvent systems and are, thus, considered to be solution polymerizations. By the term "inert solvent" is meant the solvent or diluent employed does not enter into the polymer structure nor does it have an adverse effect on the catalyst activity. Examples of such solvents are usually aliphatic, aromatic or cycloaliphatic hydrocarbons. The preferred solvents are hexane, pentane, benzene, toluene and cyclohexane. The solvent/monomer volume ratio may be varied over a wide range. Up to 20 or more/1 volume ratio of solvent to monomer may be employed. It is usually preferred to employ a solvent/monomer volume ratio of about 3/1 to about 6/1. It is possible to employ a suspension polymerization system in the practice of this invention. This may be done by choosing a solvent or diluent in which the polymer formed is insoluble.

It is usually desirable for best results to conduct polymerizations of this invention by employing air-free and moisture-free techniques.

Temperatures employed in the practice of this invention are not critical and may vary widely from a low temperature, for example, such as −10° C. or below to a high temperature of 100° C. or above. However, it is usually desirable to employ a more convenient temperature between about 20° C. and about 90° C.

The practice of the invention is further illustrated by reference to the following examples which are intended to be representative rather than restrictive of the scope of the invention. Unless otherwise noted, all parts and percentages are by weight. The dilute solution viscosities (DSV) which are reported in deciliters per gram were determined in toluene at 30° C. The glass transition temperatures (Tg) were determined using Du Pont's model 900 Differential Thermal Analyzer (DTA). The microstructures of the polypiperylenes were determined by a combination of Nuclear Magnetic Resonance (NMR), using a Varian A-60 spectrometer, and Infrared (IR) techniques, as described by D. H. Beebe, et al, in J. Polym. Sci., Part A-1 (in press). The microstructures of other polymers were determined by either NMR or IR methods.

EXAMPLE I

A premix containing a solution of transpiperylene in hexane at a concentration of 10 grams of monomer per hundred milliliters of total solution was charged to a series of 4-oz bottles. The catalyst components were charged by the in situ addition technique in the following order: The organometallic compound was charged first, followed by the chromium compound, followed by a dialkyl phosphite compound. The specific catalyst compounds in millimoles per hundred grams of monomer (mhm) are identified in Table 1 below. The bottles were placed in a water bath and maintained at 50° C. and tumbled end-over-end to provide agitation. The polymerizations were terminated by the addition of one milliliter of methanol plus one part/100 g. monomer of dibutylpara-cresol, and the polymers were isolated by drying under vacuum. Additional polymerization conditions and results are set forth in Table 1. The X-ray diffraction spectra of the polymers prepared in Runs 1 and 4 showed diffuse scattering which indicated that they were amorphous. The polymers had excellent resistance to oxidation. In an accelerated aging test in which the raw polymers are heated in a pure oxygen atmosphere at 90° C., Polymer No. 6 absorbed one weight percent of oxygen in 756 hours (anytime beyond 400 hours at 90° C. is considered very good).

Table 1

| Run # | catalyst, mhm | | | Pzn Time, Hours | Polymer Yield Wt % | DSV, dl/g | Polypentadiene Microstructure, % | | | Tg, ° C. |
|---|---|---|---|---|---|---|---|---|---|---|
| | TEAL | Cr Naph | (RO)$_2$HPO | | | | cis-1,4- | tr-1,2- | 3,4- | |
| 1 | 10 | 2 | 1 Me$^a$ | 18 | 74 | 2.5 | 71 | 24 | 5 | −47 |
| 2 | 10 | 2 | 2 Me$^a$ | 5 | 85 | 2.6 | NA$^b$ | NA$^b$ | NA$^b$ | −47 |
| 3 | 10 | 2 | 2 Bu$^a$ | 1 | 99 | 3.4 | NA$^b$ | NA$^b$ | NA$^b$ | NA$^b$ |
| 4 | 5 | 1 | 1 Bu$^a$ | 2 | 77 | 4.9 | 75 | 21 | 4 | −48 |
| 5 | 10 | 2 | 2 Oct$^a$ | 2 | 100 | 3.5 | NA$^b$ | NA$^b$ | NA$^b$ | NA$^b$ |
| 6 | 5 | 1 | 1 Oct$^a$ | 4 | 84 | 4.6 | 74 | 20 | 6 | −47 |
| 7 | 10 | 2 (ClEtO)$_3$P | 2 | 21 | 33 | 1.0 | NA$^b$ | NA$^b$ | NA$^b$ | −48 |

$^a$Me = methyl; Bu = butyl; Oct = octyl
$^b$NA = not analyzed
$^c$mhm = millimoles per 100 g of monomer
TEAL = triethylaluminum
Cr Naph = chromium naphthenate
(ClEtO)$_3$P = tris(2-chloroethyl)phosphite

EXAMPLE II

The procedure in this example was similar to that in Example I except that chromium salts of different carboxylic acids and chromium acetylacetonate were utilized as the chromium catalyst component. Results are shown in Table 2.

Table 2

| Run # | catalyst, mhm | | | Pzn. Time, Hours | Yield, Wt. % | Polypiperylene Microstructure, % dl/g. | cis-1,4 | tr-1,2- | 3,4- | Tg,° C. |
|---|---|---|---|---|---|---|---|---|---|---|
| | TEAL | Cr$^1$ | (BuO)$_2$HPO | | | | | | | |
| 1 | 12 | 2 Naph | 2 | 0.5 | 100 | 3.6 | 75 | 21 | 4 | −45 |
| 2 | 12 | 2 Dec | 2 | 01.5 | 98 | 4.4 | 74 | 21 | 4 | ND |
| 3 | 15 | 2 Oct | 2 | 0.5 | 100 | 3.8 | 75 | 21 | 4 | −44 |
| 4 | 10 | 2 AcAc | 2 | 2.0 | 85 | 3.0 | ND | ND | ND | ND |
| 5 | 5 | 1 AcAc | 1 | 18.0 | 80 | 3.6 | 72 | 22 | 6 | −44 |

$^1$Naph = Naphthenate
Dec = neo-Decanoate
Oct = Octanoate
AcAc = Acetylacetonate
ND = not determined.

EXAMPLE III

The procedure in this example was similar to that utilized in Example I except that different organoaluminum compounds were used, and in one instance, no phosphite compound was added in order to illustrate its importance to produce solid, moderately high cis-1,4-polypiperylene elastomers. Results are presented in Table III.

Table 3

| Run # | Catalyst, mhm R₁R₂Al[1] | CrNaph | (BuO)₂HOP | Pzn. Time, Hours | Yield, Wt % | DSV, dl/g | Microstructure, % cis-1,4 | tr-1,2 | 3,4- | Tg, °C. |
|---|---|---|---|---|---|---|---|---|---|---|
| 1 | 10 TIBAL | 2 | 2 | 2 | 69 | 3.8 | 72 | 23 | 5 | −45 |
| 2 | 10 DIBAH | 2 | 2 | 18 | 22 | 3.5 | 76 | 20 | 4 | −48 |
| 3 | 10 TEAL | 2 | 2 | 1 | 85 | 3.6 | ND | ND | ND | ND |
| 4 | 10 TEAL | 2 | 0 | 18 | 90 | 0.1 | 15 | 47 | 10[a] | NA |

[1] TIBAL = triisobutylaluminum
DIBA-H = diisobutylaluminum hydride
[2] ND = not determined
[a] Polymer No. 4 also contained 5 percent cis-1,2- and 23 percent trans-1,4-polypiperylene.

EXAMPLE IV

The procedure followed in this example was the same as that used in Example I except that different amounts of triethylaluminum (TEAL) were added in each experiment. Results are shown in Table 4.

Table 4

| Run # | Catalyst, mhm TEAL | CrNaph | (RO)₂HPO[1] | Pzn. Time, Hours | Yield, Wt. % | DSV dl/g |
|---|---|---|---|---|---|---|
| 1 | 20 | 2 | 5 Me | 5.0 | 99 | 2.5 |
| 2 | 15 | 2 | 2 Bu | 0.5 | 100 | 3.4 |
| 3 | 12 | 2 | 2 Bu | 0.5 | 100 | 3.6 |
| 4 | 10 | 2 | 2 Bu | 0.5 | 97 | 4.1 |
| 5 | 8 | 2 | 2 Bu | 21.0 | 41 | 4.2 |

Me = methyl
Bu = butyl

EXAMPLE V

The procedure used in this example was similar to that in Example I except that either two or all three of the catalyst components were premixed instead of adding them "in situ" to the piperylene in hexane solution. The premixed catalysts stood for 0.5 hour after mixing before injection into the premix. Results are illustrated in Table 5.

Table 5

| Catalyst, Method of Addition | Catalyst, mhm TEAL | CrNaph | (BuO)₂HPO | Pzn. Time, Hours | Polymer Yield, Wt. % | DSV, dl/g | Tg, °C. |
|---|---|---|---|---|---|---|---|
| 1. In situ | 15 | 2 | 2 | 1 | 100 | 3.4 | −44 |
| Premixed |  |  |  |  |  |  |  |
| 2. 2-components = Al/Cr | 15 + | 3 | 3 | 2 | 55 | 3.8 | −47 |
| 3. 3-components = Al/Cr/P | 15 + | 3 + | 3 | 18 | 46 | 3.3 | ND |

EXAMPLE VI

A distillate analyzed as set forth—68.5 percent trans-piperylene; 15.4 percent cyclopentene, 7.6 percent 2-methyl-2-butene, 4.0 percent cis-piperylene and about 5.5 percent of other olefinic hydrocarbons including 140 parts per million (ppm) of 1,3-cyclopentadiene and 240 ppm of 3-penten-1-yne. A solution of 4,270 grams of this distillate in 11,730 g of industrial grade hexane was passed through a silica gel column, and charged into a ten-gallon stirred reactor. Nitrogen was bubbled through the solution for two minutes and vented to remove any dissolved air. The temperature of the premix was raised to 50° C.

The catalyst components were added "in situ" as follows: (a) injected 106 milliliters of 1.8 molar triethylaluminum solution, (b) syringed in 40 mls of 0.75 M chromium naphthenate solution (=4 weight percent Cr), and (c) injected 32 ml of 1.2 M dibutyl hydrogen phosphite. There was a strong exotherm which raised the temperature in the reactor from 53° to 71° C. within about seven minutes. The temperature was restored to 50° C. after about 20 minutes with brine cooling in the jacket surrounding the reactor.

A sample of polymer cement was withdrawn from the reactor after one hour, and it had a solids content of 9.8 wt %, indicating about 54 percent conversion. After three hours, the solids content was 10.8 percent. The polymerization was terminated by adding 100 ml of a 34 percent aqueous solution of a 90 percent solution of tetrasodium salt of ethylenediaminetetraacetic acid and 23 grams of dibutyl-para-cresol dissolved in 400 mls benzene and 100 mls of methanol. The polymer cement was dried in trays at 40° C. under vacuum, and 1786 grams of dry polymer were recovered.

The microstructure of the polymer was 75 percent cis-1,4-, 21 percent trans-1,2- and 4 percent 3,4-polypiperylene. Its Mooney viscosity (ML-4 at 212° F.) was 63 and its DSV was 2.8 dl/g. The Tg was −44° C.

Thirty parts of the polymer were blended with seventy parts of natural rubber and it was evaluated in a radial tire carcass formulation. Some of its physical properties are as follows:

| Tensile strength | 15.4 | MPa |
|---|---|---|
| 300% Modulus | 9.5 | MPa |
| Elongation | 465 | percent |
| Hot Rebound | 83 | percent |

EXAMPLE VII

Seventy-five milliliters of a purified premix containing 20 volume percent of isoprene in hexane was charged to each of a series of 4-oz bottles. The isoprene contained 197 ppm of 1-penten-4-yne and 32 ppm of 1-pentyne as impurities according to gas-liquid chromatographic analysis. The catalyst components were charged by the in situ addition technique in the following order: The organometallic compound was charged first, followed by the chromium compound, followed by the dialkyl phosphite compound. The specific catalyst compounds in millimoles per hundred grams (mhm) of monomer are identified in Table VI:

Table 6

| Run # | Catalyst, mhm | | | Pzn. Time Hours | Polymer Yield, Wt % | DSV, dl/g | Polyisoprene Microstructure | | | Tg, °C. |
| --- | --- | --- | --- | --- | --- | --- | --- | --- | --- | --- |
| | TIBAL | CrNaph | (RO)₂HPO | | | | 1,4- | 1,2- | 3,4- | |
| 1 | 10 | 2 | 2 Me | 2 | 77 | 2.2 | 51 | 6 | 43 | −32 |
| 2 | 10 | 2 | 2 Bu | 2.7 | 92 | 3.6 | | NA | | NA |
| 3 | 10 | 2 | 2 Oct | 18 | 99 | 4.0 | 56 | 5 | 38 | −25 |
| 4 | 10$^a$ | 2 | 2 Bu | 2 | 84 | 2.6 | 56 | 5 | 39 | −26 |
| 5 | 5 | 1 | 1 Bu | 18 | 78 | 4.5 | 47 | 9 | 44 | −25 |

R = Alkyl groups; Me = methyl; Bu = butyl; Oct = octyl
TIBAL = triisobutylaluminum
TEAL = triethylaluminum
CrNaph = chromium naphthenate
NA = not analyzed.
$a$ = TEAL used instead of TIBAL

EXAMPLE VIII

A purified solution of trans-piperylene in n-pentane containing 10 g of piperylene per 100 ml of solution was prepared. A second purified solution in pentane containing 10 g of isoprene per 100 ml of solution also was prepared. Aliquots of these solutions were measured into a series of 4-ounce bottles to prepare premixes containing a total of 10 grams of the two monomers in various ratios ranging between 90:10 and 25:75 trans-piperylene:isoprene. The monomers then were copolymerized using the experimental procedure outlined in Example I. The catalyst charged to each bottle in this series was TEAL:Cr Octoate:(BuO)₂HPO=10:2:2 millimoles/100 grams of total monomer. The results are summarized in Table 7.

Table 7

| Run No. | t-PD[1] | IP | Pzn. Time Hours | Polymer Yield, wt. % | DSV, dl/g | Tg[2] °C. |
| --- | --- | --- | --- | --- | --- | --- |
| 1 | 100 | 0 | 1.5 | 100 | 3.8 | −44 |
| 2 | 90 | 10 | 3 | 90 | 2.3 | −42 |
| 3 | 75 | 25 | 3 | 73 | 1.6 | −40 |
| 4 | 50 | 50 | 20 | 76 | 1.3 | −37 |
| 5 | 25 | 75 | 20 | 83 | 1.2 | −30 |
| 6 | 0 | 100 | 20 | 93 | 2.8 | −23 |

[1] t-PD = trans-1,3-pentadiene
IP = isoprene
[2] Tg's determined using a DuPont Model 990 Thermal analyzer.

While certain representative embodiments and details have been shown for the purpose of illustrating the invention, it will be apparent to those skilled in this art that various changes and modifications may be made therein without departing from the spirit or scope of the invention.

What is claimed is:

1. A process to prepare solid elastomers which comprises the polymerization of at least one diolefin selected from the group consisting of trans-piperylene and isoprene by subjecting said diolefins to a catalyst comprising (A) at least one organometallic compound selected from the group consisting of aluminum trialkyls, magnesium dialkyls and zinc dialkyls, (B) at least one soluble chromium compound selected from the group consisting of chromium salts of organic acids containing from 2 to 20 carbon atoms, organic complex compounds of chromium containing tridentate ligands and π-bonded organo chromium compounds and (C) at least one phosphite compound selected from tris(2-chloroethyl)phosphite, dialkyl hydrogen phosphites containing from 1 to 20 carbon atoms in the alkyl group and containing at least one phosphinic hydrogen atom and diaryl hydrogen phosphites containing from 6 to 12 carbon atoms in the aryl group and containing at least one phosphinic hydrogen atom.

2. A process according to claim 1 wherein the organometallic compound is a trialkyl aluminum in which the alkyl groups contain at least 2 and not more than 6 carbon atoms.

3. A process according to claim 1 wherein the soluble chromium compound is selected from the group consisting of chromium salts of carboxylic acids and chromium acetylacetonate.

4. A process according to claim 1 in which the soluble chromium compound is selected from the group consisting of chromium decanoate, chromium naphthenate and chromium octanoate.

5. A process according to claim 1 wherein the phosphite member is a dialkyl hydrogen phosphite in which each alkyl group contains at least 2 and not more than 10 carbon atoms.

6. A process according to claim 5 in which the phosphite member is selected from the group consisting of diethylhydrogen phosphite, diisopropyl hydrogen phosphite, dibutyl hydrogen phosphite, dihexyl hydrogen phosphite and dioctyl hydrogen phosphite.

7. A process according to claim 1 in which the molar ratio of the organometallic compound to the chromium compound (Me/Cr) ranges from about 20/1 to about 2/1 and the phosphite member to the chromium compound (P/Cr) ranges from about 0.2/1 to about 10/1.

8. A process according to claim 1 wherein the organometallic compound is a trialkylaluminum wherein each alkyl group contains at least 2 and not more than 6 carbon atoms, the soluble chromium compound is selected from the group consisting of chromium salts of carboxylic acids and chromium acetylacetonate and the phosphite compound is a dialkyl hydrogen phosphite in which the mole ratio of the organometallic compound to the chromium compound is from about 4/1 to about 8/1 and the phosphite compound to the chromium compound is from about 0.5/1 to about 3/1.

9. A process according to claim 8 where the diolefin monomer polymerized is trans-1,3-pentadiene and where the polymer produced is a moderately stereoregular elastomer having a microstructure containing at least 70 percent isotactic cis-1,4-pentadiene.

10. A process according to claim 8 where the diolefin monomer is isoprene and wherein the polymer produced contains approximately equal amounts of 1,4- and 3,4-polyisoprene.

11. A process according to claim 1 wherein trans-1,3-pentadiene and isoprene are copolymerized to produce amorphous, elastomeric copolymers.

* * * * *